(12) United States Patent
Smelyansky et al.

(10) Patent No.: US 8,304,032 B2
(45) Date of Patent: Nov. 6, 2012

(54) METHODS FOR PROVIDING RADIATION CURED COATINGS ON SUBSTRATES

(75) Inventors: Pyotr Smelyansky, Buffalo Grove, IL (US); Kenneth W. Burton, Jr., DeKalb, IL (US)

(73) Assignee: Finishes Unlimited, Inc., Sugar Grove, IL (US)

( * ) Notice: Subject to any disclaimer, the term of this patent is extended or adjusted under 35 U.S.C. 154(b) by 0 days.

(21) Appl. No.: 13/150,427

(22) Filed: Jun. 1, 2011

(65) Prior Publication Data

US 2011/0229651 A1    Sep. 22, 2011

Related U.S. Application Data

(62) Division of application No. 12/109,547, filed on Apr. 25, 2008.

(60) Provisional application No. 60/968,990, filed on Aug. 30, 2007, provisional application No. 60/914,224, filed on Apr. 26, 2007.

(51) Int. Cl.
    *C08F 2/48* (2006.01)
(52) U.S. Cl. .......................... 427/508; 427/487; 427/492
(58) Field of Classification Search ................. 427/487, 427/492, 508
    See application file for complete search history.

(56) References Cited

U.S. PATENT DOCUMENTS

| | | | |
|---|---|---|---|
| 3,869,341 A | 3/1975 | Gotoda et al. |
| 3,909,379 A | 9/1975 | Gotoda et al. |
| 4,163,809 A | 8/1979 | McGinniss et al. |
| 4,424,252 A | 1/1984 | Nativi |
| 4,518,764 A | 5/1985 | Tanaka et al. |
| 4,634,602 A | 1/1987 | Sirkoch et al. |
| 4,777,191 A | 10/1988 | Komai et al. |
| 4,970,244 A | 11/1990 | Komai et al. |
| 5,496,589 A | 3/1996 | Igarashi et al. |
| 5,605,767 A | 2/1997 | Fuller et al. |
| 5,609,915 A | 3/1997 | Fuller et al. |
| 6,426,034 B1 | 7/2002 | McComas et al. |
| 6,596,445 B1 | 7/2003 | Matsumoto et al. |
| 6,628,595 B1 | 9/2003 | Sasa et al. |
| 6,767,980 B2 | 7/2004 | Yurugi et al. |
| 6,815,468 B2 | 11/2004 | Nixon et al. |
| 6,835,759 B2 | 12/2004 | Bradford et al. |
| 6,949,591 B1 | 9/2005 | Allard et al. |
| 7,061,847 B2 | 6/2006 | Sasa et al. |
| 7,144,544 B2 | 12/2006 | Bulluck et al. |
| 7,431,872 B2 | 10/2008 | Dostal et al. |
| 7,490,445 B2 | 2/2009 | Steffek et al. |
| 7,527,864 B2 | 5/2009 | Miller |
| 7,588,653 B2 | 9/2009 | Crandell et al. |
| 7,754,277 B2 | 7/2010 | Dressler et al. |
| 7,765,769 B2 | 8/2010 | Rosskamp et al. |
| 7,781,493 B2 | 8/2010 | Baikerikar et al. |
| 7,997,037 B2 | 8/2011 | Crandell et al. |
| 2002/0081393 A1 | 6/2002 | Kjellqvist et al. |
| 2003/0030172 A1 | 2/2003 | Hoogland et al. |
| 2003/0199655 A1 | 10/2003 | Yurugi et al. |
| 2004/0027959 A1 | 2/2004 | Sasa et al. |
| 2004/0147625 A1 | 7/2004 | Dostal et al. |
| 2004/0198862 A1 | 10/2004 | Moens et al. |
| 2004/0209101 A1 | 10/2004 | Dressler et al. |
| 2004/0235977 A1 | 11/2004 | Bulluck et al. |
| 2005/0028458 A1 | 2/2005 | Rosskamp et al. |
| 2005/0028459 A1 | 2/2005 | Crandell et al. |
| 2005/0028460 A1 | 2/2005 | Steffek et al. |
| 2005/0034386 A1 | 2/2005 | Crandell et al. |
| 2005/0153129 A1 | 7/2005 | Yoshida et al. |
| 2005/0176321 A1* | 8/2005 | Crette et al. .................. 442/103 |
| 2005/0209358 A1 | 9/2005 | Miller |
| 2005/0235883 A1 | 10/2005 | Merkley et al. |
| 2005/0266210 A1 | 12/2005 | Dolinar et al. |
| 2006/0032175 A1 | 2/2006 | Chen et al. |
| 2006/0078713 A1 | 4/2006 | Dolinar et al. |
| 2006/0099394 A1 | 5/2006 | Dolinar et al. |
| 2006/0135684 A1 | 6/2006 | Killilea |
| 2006/0135686 A1 | 6/2006 | Killilea et al. |
| 2006/0287408 A1 | 12/2006 | Baikerikar et al. |
| 2008/0193740 A1 | 8/2008 | Nesbitt |

FOREIGN PATENT DOCUMENTS

| | | |
|---|---|---|
| EP | 1 505 090 A1 | 2/2005 |
| WO | WO 03/072623 A2 | 9/2003 |
| WO | WO 2004/028250 A2 | 4/2004 |
| WO | WO 2005/001229 A2 | 1/2005 |
| WO | WO 2005/118261 A1 | 12/2005 |
| WO | WO 2006/065914 A1 | 6/2006 |
| WO | WO 2006/093916 A2 | 9/2006 |

OTHER PUBLICATIONS

Decker "Ultra-Fast Polymerization of Epoxy-Acrylate Resins by Pulsed Laser Irradiation" Journal of Polymer Science: Polymer Chemistry Edition, vol. 21 (1983) pp. 2451-2461.*
Des Roches, "Formulating Concepts of Energy-Curable Laminating Adhesives," (ASI), retrieved from: http://www.adhesivesmag.com/copyright/2c96859f60bc8010VgnVCM100000f932a8cO (Aug. 1, 2005).
Des Roches, "Formulating Concepts of Energy Curable Laminating Adhesives," (RAHN USA Corp.) retrieved from: http://www.rahn-group.com/file_uploads/bibllothek/k_51_EnergyCuring/k_52_DocumentsNewsletters/1078_9_0_LA_adhesivesMagazineEdit_engl.pdf (Retrieved Nov. 17, 2011).
Hexcel Composites, "Composite Repair," Publication No. UTC 102: 1-13 (Apr. 1999).
Roches et al., "Formulating Goals of Energy Curable Pressure Sensitive Adhesives," RAHN USA Corporation, 1-9 (2006).
SpecialChem web site, "Why use polymeric adhesion promoters?" http://www.specialchem4polymers.com/tc/adhesion-promoters/index.aspx. Accessed Jul. 7, 2011.
*ASTM Standards D* 3359-93, "Standard Test Methods for Measuring Adhesion by Tape Test," 1-6 (1993).

* cited by examiner

*Primary Examiner* — Robert S Walters, Jr.
(74) *Attorney, Agent, or Firm* — Leydig, Voit & Mayer, Ltd.

(57) ABSTRACT

Curable coating composition suitable for use on composite substrates such as plastic composites, cementitious composites, ceramic composites, and engineered wood, or on plastic materials. The curable coating composition comprises a multifunctional oligomer, a monomer selected from the group consisting of monofunctional monomers, difunctional monomers and mixtures thereof, a photoinitiator, a polyester resin and a polycarboxylic acid. Also disclosed is a method of coating the substrates with the curable coating composition and a coated substrate wherein the cured coating resides on the surface of the substrate.

43 Claims, No Drawings

METHODS FOR PROVIDING RADIATION CURED COATINGS ON SUBSTRATES

CROSS-REFERENCE TO RELATED APPLICATIONS

This patent application is a divisional of co-pending U.S. patent application Ser. No. 12/109,547, filed Apr. 25, 2008, which claims the priority to and the benefit of U.S. Provisional Patent Application No. 60/968,990, filed Aug. 30, 2007, and U.S. Provisional Patent Application No. 60/914,224, filed Apr. 26, 2007, the disclosures of the '547, the '990, and '224 applications are incorporated by reference.

BACKGROUND OF THE INVENTION

Composite substrates such as cementitious composites, plastic composites, ceramic composites, and engineered woods are well known. These materials are currently used in many construction and manufacturing applications, for example, outdoor deck flooring, railings, fences, landscaping timbers, cladding and siding, park benches, molding and trim, window and door frames, and indoor furniture.

While coatings have been developed for application onto the exterior surface of these substrates, drawbacks remain. Thus, there exists a need for improved: coating compositions suitable for application onto composite substrates; methods of preparing coated composite substrates; and coated composite substrates per se.

The invention provides improved coating compositions, coated substrates and methods for their preparation. The advantages of the invention, as well as additional inventive features, will be apparent from the description of the invention provided herein.

BRIEF SUMMARY OF THE INVENTION

The foregoing and other needs are fulfilled by the present invention which provides, in one aspect, a radiation curable coating composition suitable for application onto the surface of a variety of substrates, desirably the surface of composite substrates such as cementitious composites, plastic composites, ceramic composites, plastic composites and engineered woods, as well as the surface of plastics per se. The radiation curable coating composition comprises a multifunctional oligomer, a monomer selected from the group consisting of monofunctional monomers, difunctional monomers and mixtures thereof, a photoinitiator, a polyester resin and a polycarboxylic acid.

In another aspect, the invention provides a method for preparing a coated composite substrate comprising applying a radiation curable coating composition onto the substrate and curing the coating composition by exposing the curable coating to radiation, wherein the curable coating composition comprises a multifunctional oligomer, a monomer selected from the group consisting of monofunctional monomers, difunctional monomers and mixtures thereof, a photoinitiator, a polyester resin and a polycarboxylic acid.

Yet another aspect of the present invention provides a coated composite substrate comprising the substrate and a radiation-cured coating on the surface of the substrate, wherein the radiation-cured coating is formed by exposing to radiation a radiation-curable coating composition comprising a multifunctional oligomer, a monomer selected from the group consisting of monofunctional monomers, difunctional monomers and mixtures thereof, a photoinitiator, a polyester resin and a polycarboxylic acid.

DETAILED DESCRIPTION OF THE INVENTION

It has been discovered that radiation-curable coating compositions comprising a multifunctional oligomer, a monomer selected from the group consisting of monofunctional monomers, difunctional monomers and mixtures thereof, a photoinitiator, a polyester resin and a polycarboxylic acid, provides performance advantages relative to existing coatings, and is particularly useful when applied and cured on certain substrates—composite substrates such as cementitious composites, plastic composites, ceramic composites, and engineered woods, as well as on plastics per se. For example, and among other benefits, the inventive coating, after curing on a composite substrate such as a cementitious composite, a plastic composite, a ceramic composite, a plastic composite, engineered wood or plastic, adheres well to these substrates even after exposure of the coated material to a range of temperatures, moisture and sunlight; resists marring and abrasion; provides an aesthetically pleasing appearance; and is readily applied onto the material, and quickly cured, permitting its use in a high-speed manufacturing environment.

Turning initially to the radiation-curable compositions of the present invention, the compositions comprise a multifunctional oligomer. This oligomer should be curable by radiation, and may desirably constitute, for example, an acrylate, and more desirably a urethane acrylate, such as aliphatic and aromatic urethane acrylates, epoxy acrylates, melamine acrylates, polyester acrylates, polyether acrylates, silicone acrylates, dendritic acrylates, polybutadiene acrylates, amine acrylates, acrylic acrylates, amido and spiro ortho carbonate esters, and mixtures thereof. Aliphatic urethane acrylates are preferred, with trifunctional aliphatic polyester urethane acrylate oligomers being most preferred. Illustrative of aliphatic urethane acrylates suitable for use in the present invention include those marketed by Cytec Surface Specialties under the trademark EBECRYL as 264, 265, 284N, 1290, 4866, 4883, 8210, 8301, 8402, 8405, 5129 and 8411; those marketed by Sartomer as CN985B88, 964, 944B85, 963B80, CN 929, CN 996, CN 968, CN 980, CN 981, CN 982B90, CN 983, CN991; CN 2920, CN 2921, CN 9006, CN 9008, CN 9009, CN 9010; GENOMER 4302, 4312 and 4316 available from Rahn; Desmolux XP 2513 and VPLS 2265 available from Bayer Material Science Corporation; PHOTOMER 6892 and 6008 available from Cognis; and NK OLIGO™ U24A and U-15HA™ available from Kowa. Additional suppliers of aliphatic urethane acrylates include the BR series of aliphatic urethane acrylates (for example, BR 144 and 970) available from Bomar Specialties or the LAROMER series of aliphatic urethane acrylates from BASF.

The multifunctional oligomer may be of any suitable molecular weight so long that it does not impart excessive viscosity to the coating composition. This being said, the number average molecular weight may desirably range from about 1,000 to about 10,000, preferably from about 1,000 to about 8,000, more preferably from about 1,000 to about 5,000, and most preferably from about 1,200 to about 3,000.

The amount of the multifunctional oligomer in the curable composition may range from about 10% to about 80% by weight of the curable composition, but is desirably present at, for example, from about 15% to about 60% by weight of the curable composition, preferably from about 20% to about 55% by weight of the curable composition, and more preferably from about 25% to about 50% by weight of the curable composition.

The curable coating compositions of the invention further comprise a monomer selected from the group consisting of monofunctional monomers, difunctional monomers and mixtures thereof. Any suitable monomer which possesses the aforementioned properties and which is radiation curable may be used in the curable coating composition of the present invention. Examples of monomers suitable for inclusion in the curable compositions include styrene, alpha-methylstyrene, substituted styrene, vinyl ester, vinyl ether, N-vinyl-2-pyrrolidone, (meth)acrylamide, N-substituted (meth)acrylamide, octyl(meth)acrylate, nonylphenol ethoxylate(meth)acrylate, isononyl(meth)acrylate, isobornyl(meth)acrylate, 2-(2-ethoxyethoxy)ethyl(meth)acrylate, 2-ethylhexyl(meth)acrylate, lauryl(meth)acrylate, beta-carboxyethyl(meth)acrylate, isobutyl(meth)acrylate, cycloaliphatic epoxide, alpha-epoxide, 2-hydroxyethyl(meth)acrylate, (meth)acrylonitrile, maleic anhydride, itaconic acid, isodecyl(meth)acrylate, dodecyl(meth)acrylate, n-butyl(meth)acrylate, methyl(meth)acrylate, hexyl(meth)acrylate, (meth)acrylic acid, N-vinylcaprolactam, N-vinylformamide, stearyl(meth)acrylate, hydroxy functional caprolactone ester(meth)acrylate, isooctyl(meth)acrylate, hydroxyethyl(meth)acrylate, hydroxymethyl(meth)acrylate, hydroxypropyl(meth)acrylate, hydroxyisopropyl(meth)acrylate, hydroxybutyl(meth)acrylate, hydroxyisobutyl(meth)acrylate, tetrahydrofurfuryl (meth)acrylate, ethylene glycol di(meth)acrylate, hexanediol di(meth)acrylate, triethylene glycol di(meth)acrylate, tetraethylene glycol di(meth)acrylate, dipropylene glycol di(meth)acrylate, and alkoxylated polyol derived diacrylates, such as propoxylated neopentyl glycol diacrylate, neopentyl glycol di(meth)acrylate, and mixtures thereof (wherein "(meth)acrylate" refers to an acrylate and a methacrylate). Desirably, the monomers include isobornyl acrylate, isodecyl acrylate, 1,6-hexanediol diacrylate, and mixtures thereof.

The monomer may be present in the curable composition in any suitable amount, for example, in an amount ranging from about 25% to about 75% by weight of the composition, preferably ranging from about 30% to about 65% by weight of the composition, and more preferably from about 35% to about 55% by weight of the composition.

The inventive curable coating compositions also comprise a photoinitiator. Photointiators are well known in the art, and any photoinitiator capable of assisting in the cure of the curable composition may be used. Illustrative of suitable photoinitiators are phosphine oxides, ketones and their derivatives, benzophenones, carbocyanines and methines, polycyclic aromatic hydrocarbons, such as anthracene or the like, and dyestuffs, such as xanthenes, safranines and acridines. More generally, the photoinitiators may be chemical substances belonging to one of the following major categories: compounds containing carbonyl groups, such as pentanedione, benzil, piperonal, benzoin and its halogenated derivatives, benzoin ethers, anthraquinone and its derivatives, p,p'-dimethylaminobenzophene, benzophenone and the like; compounds containing sulfur or selenium, such as the di- and polysulfides, xanthogenates, mercaptans, dithiocarbamates, thioketones, beta-napthoselenazolines; peroxides; compounds containing nitrogen, such as azonitriles, diazo compounds, diazides, acridine derivatives, phenazine, quinoxaline, quinazoline and oxime esters, for example, 1-phenyl-1,2-propanedione 2-[0-(benzoyl)oxime]; halogenated compounds, such as halogenated ketones or aldehydes, methylaryl halides, sulfonyl halides or dihalides; phosphine oxides and photoinitiator dyestuffs, such as diazonium salts, azoxybenzenes and derivatives, rhodamines, eosines, fluoresceines, acriflavine or the like. Common photoinitiators include 2,2-diethoxyacetophenone, dimethoxyphenylacetophenone, phenyl benzoin, benzophenone, substituted benzophenones, phosphine oxides and the like.

It is also possible to use mixtures of photoinitiators. For example, such mixtures may include combinations of camphorquinone; benzophenone; benzophenone derivatives (e.g. 1-[4-(4-benzoyl-phenylsulfanyl)-phenyl]-2-methyl-2-(toluene-4-sulfonyl)-propan-1-one); acetophenone, acetophenone derivatives, for example, alpha-hydroxycycloalkyl phenyl ketones or dialkoxyacetophenones; alpha-hydroxy- or alpha-amino-acetophenones, for example, oligo-[2-hydroxy-2-methyl-1-[4-(1-methylvinyl)-phenyl]-propanone], 2-hydroxy-2-methyl-1-phenyl-1-propanone, 2-hydroxy-1-[4-(2-hydroxy-ethoxy)-phenyl]-2-methyl-propan-1-one, 2-methyl-1-[4-(methylthio)phenyl]-2-(4-morpholinyl)-propan-1-one, 2-dimethylamino-2-(4-methylbenzyl)-1-(4-morpholin-4-yl-phenyl)-butan-1-one, 2-benzyl-2-dimethylamimo-1-(3,4-dimethoxy-phenyl)-butan-1-one, 2-benzyl-2-dimethylamino-1-(4-morpholin-4-yl-phenyl)-butan-1-one, 2-methyl-1-(4-methylsulfanyl-phenyl)-2-morpholin-4-yl-propan-1-one; 1-hydroxy-cyclohexylphenylketone; 4-aroyl-1,3-dioxolanes; benzoin alkyl ethers and benzil ketals, for example, benzil dimethyl ketal, phenyl glyoxalates and derivatives thereof, for example, methylbenzoyl formate; dimeric phenyl glyoxalates, for example, oxo-phenyl-acetic acid 2-[2-(2-oxo-2-phenyl-acetoxy)-ethoxy]-ethyl ester; peresters, for example, benzophenone- tetracarboxylic acid perestels, as described, for example, in U.S. Pat. Nos. 4,777,191 and 4,970,244; monoacylphosphine oxides, for example, (2,4,6-trimethylbenzoyl)-diphenyl-phosphine oxide or phenyl-(2,4,6-trimethylbenzoyl)-phosphinic acid ethyl ester, bisacylphosphine oxides, for example, bis(2,6-dimethoxybenzoyl)-(2,4,4-trimethyl-pent-1-yl)phosphine oxide, phenylbis(2,4,6-trimethylbenzoyl)-phosphine oxide or bis(2,4,6-trimethylbenzoyl)-(2,4-dipentoxyphenyl)phosphime oxide, trisacylphosphine oxides; halomethyltriazines, for example, 2-[2-(4-methoxy-phenyl)-vinyl]-4,6-bis-trichloromethyl-[1,3,5]triazine, 2-(4-methoxy-phenyl)-4,6-bis-trichloromethyl-[1,3,5]triazine, 2-(3,4-dimethoxy-phenyl)-4,6-bis-trichloromethyl-[1,3,5]triazine, 2-methyl-4,6-bis-trichloromethyl-[1,3,5]triazine; hexaarylbisimidazole/coinitiator systems, for example, ortho-chlorohexaphenyl-bisimidazole together with 2-mercaptobenzthiazole; ferrocenium compounds or titanocenes, for example, dicyclopentadienyl bis(2,6-difluoro-3-pyrrolo-phenyl)titanium; and borate photoinitiators or O-acyloxime photoinitiators as described, for example, in U.S. Pat. No. 6,596,445. Preferred photoinitiators include phenylbis(2,4,6-trimethylbenzoyl)-phosphine oxide, 1-hydroxy-cyclohexylphenylketone, 2-hydroxy-2-methyl-1-phenyl-1-propanone, phosphine derivatives, and mixtures thereof, with a combination of phenylbis(2,4,6-trimethylbenzoyl)-phosphine oxide and 1-hydroxy-cyclohexylphenylketone being more preferred when using UV pulse light technology, as described herein Without being bound to any particular theory, it is believed that three components of the inventive uncured composition—the photoinitiator, polyester resin and polycarboxylic acid—influence the adhesion of the coating on the substrate after curing. More specifically, it was found that the photoinitiator, while necessary for effective curing, adversely affects curing when present at relatively high levels. It was further found that, while the polyester resin and polycarboxylic acid assist in providing satisfactory adhesion, the level of the polyester resin is desirably controlled because this component also adversely affects adhesion of the cured coating when included at relatively high levels. Thus, it is advantageous to include both the polyester resin and polycarboxylic acid to enhance the adhesion of the cured coating to the various composite substrates, while limiting the amounts of photoinitiator and polyester resin in the curable coating as described in the following paragraphs in order to optimize the adhesion of the cured coating to these substrates.

Turning initially to the photoinitiator, while this component may be included in the curable composition in a widely varying amount, the amount of this component is desirably limited to that which assists in providing adequate curing of the coating, but which does not adversely affect the adhesion of the cured coating to the substrate. Preferably, the amount of photoinitiator in the curable composition ranges from about 0.001% to about 10% by weight, more preferably from about 0.05% to about 6% by weight, and most preferably from about 0.1% to about 5% by weight of the uncured composition.

A polyester resin is another component of the curable coating composition. Examples of resins suitable for inclusion in the composition are Co-Resin 02-819/M22 available from Rahn and UVP6000-TP20 available from Polymer Technologies Ltd.

The polyester resin may also be included in the curable composition in varying amounts, but is desirably limited to that which does not adversely affect the adhesion of the cured coating onto the substrate. Preferably, the amount of this resin may range from about 1% to about 20% by weight, more preferably from about 1% to about 15% by weight, and most preferably from about 1% to about 10% by weight of the curable composition A polycarboxylic acid is a further component of the curable composition. While polycarboxylic acids suitable for use in the inventive compositions include, for example, BYK-P-104 available from BYK Chemie and EFKA5006 available from Ciba Specialty Chemicals, it is preferred that the acid be unsaturated. Without being bound to any particular theory, it is believed that the unsaturated polycarboxylic acid, upon curing, will become polymerized with other components of the curable composition, thereby providing the cured composition with enhanced adhesion due to the presence of the acid functionality within the cured coating.

The polycarboxylic acid may be included in the curable composition in any amount suitable to provide the desired properties in the cured coating, e.g., adhesion. In this regard, the amount of polycarboxylic acid may range broadly, but desirably ranges from about 0.01% to about 10% by weight, more preferably from about 0.01% to about 5% by weight, and most preferably from about 0.01% to about 3% by weight of the uncured composition.

In a related aspect of the invention, the curable coating composition is non-aqueous, and is desirably substantially free of an organic solvent. If present, the organic solvent is desirably limited to between about 0.001% by weight to about 5% by weight, more desirably about 0.001% by weight to about 2% by weight, and preferably about 0.001% by weight to about 1% by weight of the uncured composition. Most preferably, the composition should have less than about 1% by weight organic solvent in the uncured composition.

The curable coating composition of the invention may further include one or more supplemental adhesion promoters which, as its name implies, are believed to enhance the adhesion of the cured coating to the substrate, and in particular to the preferred substrates—cementitious composites, plastic composites, ceramic composites, and engineered woods. The supplemental adhesion promoter may be present in any suitable amount, but is desirably present from about 0.1% to about 20% by weight, preferably from about 0.1% to about 18% by weight, and more preferably from about 0.5% to about 16% by weight of the uncured composition. Illustrative supplemental adhesion promoters include: phosphoric acid esters, e.g., Genorad 40 available from Rahn, Etermer 39 available from Eternal Chemical Co., Ebecryl 168 and 171 available from Cytec Surface Specialties, and Sartomer CD-9050, CD-9051, and CD-9053 available from Sartomer; acrylic or acrylic acrylate resins, e.g., methyl methacrylate and n-butyl methacrylate sold as Degalan LP 64/12 and available from Degussa Co.; acrylic acrylate sold as Lumicryl 1908, JR5-209, JR5-219, JR5-243 available from Estron Chemical, Inc.; acrylic acrylate sold as Ebecryl 745, Ebecryl 1710 from Cytec Surface Specialties; and mixtures thereof.

A mixture of supplemental adhesion promoters may be used when enhanced adhesion of the cured coatings is desired. For example, the inclusion of acrylic or acrylic acrylate resins in such a mixture has been found to enhance adhesion of the cured coatings without unduly increasing the viscosity of the uncured coating compositions.

As a means of enhancing the aesthetic qualities of the coating, and thus of the substrate, the curable coating composition may, if desired, include a colorant. Any suitable colorant may be employed, such as a pigment, a dye or a combination thereof The colorant may be present in any amount suitable to impart the desired coloration to the cured coating, and preferably ranges from about 0.1% to about 10% by weight, more preferably from about 1% to about 8% by weight, and most preferably from about 1% to about 5% by weight of the curable composition.

If used, suitable pigments include, but are not limited to, inorganic pigments such as titanium dioxide, zinc white, zinc sulfide, lithopones, carbon black, iron manganese black, spinel black, chromium oxide, chromium oxide hydrate green, cobalt green, ultramarine green, cobalt blue, ultramarine blue, manganese blue, ultramarine violet, cobalt violet, manganese violet, red iron oxide, cadmium sulfoselenide, molybdate red, ultramarine red, brown iron oxide, mixed brown, spinel phases, corundum phases, chrome orange, yellow iron oxide, nickel titanium yellow, chrome titanium yellow, cadmium sulfide, cadmium zinc sulfide, chrome yellow, bismuth vanadate, iron oxide, diiron oxide, iron oxide hydrate, and mixtures thereof Organic pigments may also be used, either alone or in combination with another type of colorant. Examples of suitable organic color pigments include, but are not limited to, monoazo pigments, diazo pigments, anthraquinone pigments, benzimidazole pigments, quinacridone pigments, quinophthalone pigments, diketopyrrolovyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black. Preferred pigments are the inorganic pigments, with titanium dioxide, yellow iron oxide, red iron oxide and mixtures thereof being preferred. Illustrative of transparent pigments suitable for use in the present invention include those marketed by BASF as SICOTRANS® Yellow L 1916 and SICOTRANS® Red L 2715 D.

Additionally, it was found that pigmented coatings may provide the coated substrate with one or more desirable properties other than enhanced appearance (coloration), such as improved weatherability, adhesion, and gloss retention. For example, it was found that the inclusion of inorganic pigments, such as the oxides, provided the cured coating with enhanced resistance to sun exposure (e.g., blistering, peeling and the like), especially when the coating is applied onto certain wood-containing composites. When included in compositions for exterior applications, it is preferred that exterior grade oxides and transparent oxides be included in the coatings.

The coating compositions may also include one or more aesthetic agents which provide the cured coating with the desired finish. For example, certain agents will function to reduce the gloss of the cured coating composition (gloss reducing agents), while others may be used to reduce the increase the slip-resistance of the cured coating or impart a stucco-like finish thereto. While any material which functions to impart one or more of the foregoing properties to the cured coating composition may be used, silica sand, quartz grit, silica, talc, and micronized silica gel are desired, with silica, talc or micronized silica gel being preferably used when gloss reduction is desired.

While the aesthetic agent may be present in any amount desired such that the properties described herein are attained, the amount of the agent may desirably range from about 0.1% to about 30% by weight, preferably from about 1% to about 25% by weight, and more preferably from about 10% to about 20% by weight, all based on the weight of the curable composition. One skilled in the art upon reading this disclosure also would be readily able to determine the appropriate size of the particulates which constitute the agent. Desirably, the silica sand may range from about 20 to about 100 mesh, and more preferably from about 30 to about 50 mesh, while the quartz grit used is desirably about no. 3 quartz grit.

When an aesthetic agent and/or pigment is included in the curable composition, it is preferred to include a relatively lower amount of the oligomer, and include both a monofunctional and a difunctional monomer, in the curable composition. In this respect, and by way of example, a preferred curable composition containing a gloss reducing agent may comprise about 15% to about 40% by weight of a multifunctional oligomer, about 30% to about 70% by weight of a monomer, about 0.001% to about 4% by weight of a photoinitiator, about 1% to about 10% by weight of a polyester resin, and about 0.1% to about 5% by weight of a polycarboxylic acid, wherein the monofunctional monomer constitutes at least about 50% by weight, more preferably at least about 70% by weight, and most preferably at least about 80% by weight of the total weight of the monomers included in the curable composition. The agent (e.g., gloss reducing agent) may desirably be present in an amount ranging from about 0.1% to about 30% by weight, preferably from about 1% to about 25% by weight, and most preferably from about 3% to about 20% by weight of the curable composition, while the pigment may be present in an amount ranging from about 0.1% to about 15% by weight, preferably from about 1% to about 10% by weight, and most preferably from about 2% to about 6% by weight of the curable composition.

In preferred curable compositions as described herein wherein an aesthetic agent (e.g., gloss reducing agent) is included in the absence of a pigment, the aforesaid reduction in oligomer content may be used, with the weight ratio of monofunctional to difunctional monomer ranging from about 1:1 to about 5:1, and preferably from about 3:1 to about 4:1. Conversely, in preferred curable compositions as described herein wherein a pigment is included with an aesthetic agent (e.g., gloss reducing agent), the aforesaid reduction in oligomer content may be used, with the weight ratio of monofunctional to multifunctional (e.g., difunctional) monomer ranging from about 20:1 to about 5:1, and preferably from about 15:1 to about 10:1.

The thickness of the cured coating is desirably controlled to provide the properties desired in the finished product. Typically, the coatings will have an average thickness of about 0.1 mil to about 20 mils, however coatings that exceed these typical ranges may be used depending on the desired finished product.

The inventive curable compositions, after application onto a substrate, e.g., a cementitious composite, a plastic composite, a ceramic composite, engineered wood, or plastic, are cured by exposure to actinic radiation, preferably ultraviolet (UV) radiation or pulsed UV radiation, the latter desirably used when temperature-sensitive substrates are used, e.g., certain plastics (e.g., PVC) and plastic composites (e.g., PVC composites). UV curing is well known to those skilled in the art, including determining the wavelength of radiation and exposure time suitable for curing. UV curing may be effected by using one, two or three UV lamps of different wavelengths, with the number of lamps increasing as the thickness of the uncured coating increases. Illustrative of lamps that may be used include mercury lamps, gallium doped lamps, iron doped lamps, pulsed UV radiation, and combinations thereof The composite substrates referred to herein are well known to those skilled in the art, and are generally used in the construction industry and in the production of furniture, among other uses. The preferred composites are generally described as cementitious composites, plastic composites, ceramic composites, and engineered woods, although the composites used in the present invention should not be limited to these specific examples.

The structure of the aforementioned composite substrates are well known to those skilled in the art, and are generally prepared using two or more different materials that remain separate and distinct on a macroscopic level. The composite substrates may be thought of as comprising two categories of constituent materials, a matrix and reinforcement and/or filler materials. Matrix materials include, for example, bitumen, cements, polymers (e.g., PVC), metals and ceramics. Reinforcement and/or filler materials include, for example, aggregate, sand, crushed stone, ground minerals, calcium carbonate, calcium sulfate, aluminum trihydrate, talc, cellulosics (e.g., pond sludge, wood flour, sawdust, newspapers, alfalfa, wood pulp, wood chips, wood fibers, paper, cardboard and straw), steel reinforcing bars, glass fibers, C-glass, E-glass, S-glass, quartz, polymer fibers, nylon based polymer fibers, aramid fibers, polyethylene based polymer fibers, natural fibers, hemp fibers, sisal fibers, carbon fibers, rayon based carbon fibers, polyacrylonitrile-based carbon fibers, pitch-based carbon fibers, ceramic fibers, alumina silica mixtures, silicon carbide, boron, textiles, felts, woven fabrics, plain weave fabrics, twill weave fabrics, satin weave fabrics, and stitched construction fabrics.

By way of example, a cementious composite may generally comprise a matrix comprising a cementitious material, an aggregate material and one or more reinforcement and/or filler materials incorporated therein. Generally, the cementitious material (e.g., Portland cement, high alumina cement, lime, high phosphate cement, ground granulated blast furnace slag cement and mixtures thereof) may comprise at least about 10% to about 80% by weight of the composite substrate, preferably at least about 20% by weight of the substrate, and more preferably at least about 25% by weight of the substrate. The reinforcement and/or filler materials include aggregate materials such as, for example, include silica-based materials, desirably ground silica sand, but may also be amorphous silica, diatomaceous earth, coal combustion fly and bottom ash, rice hull ash, blast furnace slag, granulated slag, steel slag, mineral oxides, mineral hydroxides, clays, dolomite, metal oxides and hydroxides, polymeric beads, cellulosics, polymer fibers and mixtures thereof. An illustrative cementitious composite may comprise from about 10% to about 80% by weight cement, about 20% to about 80% by weight aggregate (e.g., silica) and about 0.5% to about 20% by weight of a non-aggregate fibrous material, e.g., cellulosic or polymer fibers. A further example comprises about 20% to about 50% by weight cement, about 30% to about 60% by weight aggregate (e.g., silica) and about 0.5% to about 15% by weight fibers. Examples of cementitious composites are provided in U.S. Published Patent Application 2005/0235883A1.

A plastic composite may generally comprise a matrix comprising a plastic material and one or more reinforcement materials. Generally, the plastic material may comprise at least about 15% by weight of the substrate, preferably at least about 20% by weight of the substrate, and more preferably at least about 25% by weight of the substrate. More preferably, the plastic may comprise from about 30% to about 60% by weight of the composite.

The term plastic or plastic material as used in connection with the substrates described herein (a plastic composite substrate or plastic substrate, the latter being further described below) is understood by those skilled in the art, and may include a wide variety of polymeric materials such as polyethylene (e.g., low-density (LDPE) and high-density polyethylene (HDPE)), polypropylene (PP), polystyrene (PS), acrylonitrile butadiene styrene (ABS), poly(polyethylene terephthalate), polyester, polyamides, polyvinyl chloride (PVC), polyurethane, polycarbonate, poly(vinyldiene chloride), poly(methyl methacrylate), polytetrafluoroethylene, polyetheretherketone, polyetherimide, phenolics, phenol formaldehyde, urea formaldehyde, melamine formaldehyde, melamine formaldehyde, polylactic acid, plastarch material and mixtures thereof. In plastic composites, PVC, ABS, PP, HDPE and PS are preferred plastic materials, with cellulosics (most desirably wood products such as wood flour) being the preferred reinforcement material. An illustrative plastic composite is described in U.S. Published Patent Application 2004/0147625.

A plastic composite wherein polyvinyl chloride (PVC) is the plastic material (which may be referred to as a PVC composite) included therein may generally comprise a matrix comprising PVC, wherein the PVC is desirably present in the composite from about 50 to about 95 wt. %, more desirably from about 70 wt. % to about 90 wt. %, and most desirably from about 80 wt. % to about 90 wt. %; a plasticizer, wherein the plasticizer is desirably present in the composite from about 0.1 to about 20 wt. %, more desirably from about 1 wt. % to about 10 wt. %, and most desirably from about 1 wt. % to about 5 wt. %; and one or more reinforcing materials (e.g., fillers), wherein the reinforcing material is desirably present in the composite from about 0.1 to about 20 wt. %, more desirably from about 1 wt. % to about 15 wt. %, and most desirably from about 2 to about 10 wt. %.

Plasticizers suitable for use in the PVC composite are known in the art and include phthalates, and desirably alkyl phthalates such as diisodecyl phthalate. Epoxidized soybean oil may also be used as a plasticizer.

Fillers suitable for inclusion in the PVC composite are also known in the art and include, but are not limited to, calcium carbonate, clays, silicate and talc. Other optional components include colorants, flame retardants and stabilizers. Generally, it is desired that the PVC composite be colored, preferably white. Colorants suitable for imparting a white color to the PVC composite include titanium dioxide, with optical brighteners also being added to enhance appearance.

The PVC composite may be in any form, but is preferably extruded prior to application of the curable coatings described herein onto the composite.

A ceramic composite may generally comprise a matrix comprising ceramic material and one or more reinforcement materials. Generally, the ceramic material may comprise at least about 15% by weight of the substrate, preferably at least about 20% by weight of the substrate, and more preferably at least about 25% by weight of the substrate.

Engineered wood may generally comprise a matrix comprising wood and one or more reinforcement materials, the latter desirably constituting one or more organic materials, e.g., flax, corn stover, natural fibers, bamboo, and other materials that would readily be understood as such. Generally, wood may comprise at least about 15% by weight of the substrate, preferably at least about 20% by weight of the substrate, and more preferably at least about 25% by weight of the substrate.

The curable coating compositions of the present invention also may be used to coat plastic substrates. Generally, the plastic material (as described above) may comprise more than least about 99% by weight of the plastic substrate. Most preferably, the plastic substrate will be substantially free of material that is not plastic. The coatings find particular use in coating PVC plastic substrates.

The present invention also provides methods for preparing a coated composite substrate or coated plastic substrate and the resulting coated substrate per se. The inventive method for preparing the coated composite substrate or coated plastic substrate comprises applying a radiation curable coating composition as described herein onto a composite substrate or plastic substrate as described herein, and curing the coating composition by exposing the curable coating to radiation. The coated composite substrate or coated plastic substrate comprises the composite or plastic substrate as described herein and a radiation-cured coating on the surface of the substrate as described herein.

Preferably, and as will be appreciated by those skilled in the art, the curable coating may be applied directly onto the surface of the composite or plastic substrate by any suitable means, including but not limited to, brushes, rollers, spray devices, vacuum coaters and the like. Moreover, the curable coating may be applied onto the surface of the composite substrate or plastic substrate in the absence of a primer. This provides further efficiencies by eliminating the need for an additional component and processing step. This being said, the present invention does not exclude the use of a primer or priming method (e.g., fluoroxidation, heat, corona, and plasma priming) on a composite or plastic substrate prior to application of the curable coating composition thereon.

The properties of the curable coatings described herein may be tested in accordance with methods published by the American Society For Testing And Materials (ASTM) and Japanese Industrial Standards (JIS), and desirably meets at least one and more desirably a plurality of these test standards. The adhesion of the cured coating to the substrates disclosed herein may be measured using ASTM 3359, ASTM D 6944-03 Method B, ASTM D 4585, ASTM D 6943-03, ASTM G-154, ASTM D5402, ASTM D3023, ASTM D3273, ASTM D3274, and JIS Z 2801:2000. Desirably, and under ASTM 3359, the cured coating composition will have an adhesion value when applied and cured on a substrate of at least 4B (80%), and preferably 5B (100%), and will preferably retain this value after 96 hours at 20° F.-25° F., and will more preferably retain this value after 144 hours at 120° F. Preferably, and under a test similar to ASTM D 6944-03 Method B (25 cycles of 8 hours of freezing followed by 16 hours of heating), the cured coating composition will have an adhesion value when applied and cured on a substrate of at least 4B, and preferably 5B. Preferably, and under ASTM D 4585 (1000 hours), the cured coating composition will show no effects from the test and will have a gloss retention of 95% and a ΔE (CIELAB) of about 1.5 units. Preferably, and under ASTM D 6943-03 (immersion test using water for 30 days), the cured coating composition will show no visual change and will have an adhesion value when applied and cured on a substrate of at least 4B, and preferably 5B. Preferably and under a test similar to ASTM G-154 (QUV Weather Test, consisting of a 1000 hours of the following cycles: 12 hours of UV light at a wavelength of 340 nm, followed by 11 hours and ten minutes of condensation, followed by ten minutes of water spray), the cured coating composition will have a gloss retention (60° meter) of at least about 70%, preferably at least about 80%, and more preferably at least about 90%, and color change measured as ΔE (CIELAB) of less than about 5 units, preferably less than about 3 units, and more preferably less than about 2 units. Preferably, and under ASTM D5402 (solvent resistance test using MEK with 100 double rubs), the cured coating composition will show no effect from the test. Preferably, and under ASTM D3023 (stain resistance test using mustard, ketchup, barbeque sauce, red wine, relish, and magic marker as stain compounds for 24 hours and cleaned with soap and water), the stain compounds are easily cleaned with no effect on the cured coating composition. Preferably, and under ASTM D3273 and ASTM D3274 (mold growth resistance test conducted for 28 days) the cured coating will show mold growth of at least about 8 (per ASTM D3274), preferably mold growth of at least about 9, and more preferably mold growth of about 10 (no discernable growth). Preferably, and under JIS Z 2801:2000 (antimicrobial activity test using $S.$ $aureus$, $E.$ $coli$, and $K$ $pneumonae$) the cured coating composition will show a reduction of antimicrobial activity of at least about 90%, preferably a reduction of antimicrobial activity of at least about 95%, and more preferably a reduction of antimicrobial activity of at least about 99%.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A method for providing a substrate with a cured coating comprising applying a curable coating composition onto a composite substrate and curing the curable coating composition, wherein the curable coating composition comprises a trifunctional oligomer, a monomer or monomer mixture selected from the group consisting of monofunctional monomers, difunctional monomers and mixtures thereof, a photoinitiator, a polyester resin, a supplemental adhesion promoter comprising a phosphoric acid ester, and a polycarboxylic acid, wherein the polyester resin comprises about 1% by weight of the composition.

2. The method of claim 1, wherein the trifunctional oligomer comprises about 10% to about 80% by weight of the composition, the monomer or monomer mixture comprises about 25% to about 75% by weight of the composition, the photoinitiator comprises 0.001% to about 10% by weight of the composition, the polyester resin comprises about 1% by weight of the composition, the supplemental adhesion promoter comprises about 0.1% to about 5% by weight of the composition, and the polycarboxylic acid comprises about 0.01% to about 10% by weight of the composition.

3. The method of claim 1, wherein the curable coating composition is substantially free of organic solvent.

4. The method of claim 1, wherein the curable coating composition comprises no more than about 5% by weight of an organic solvent.

5. The method of claim 4, wherein the curable coating composition comprises no more than about 1% by weight of an organic solvent.

6. The method of claim 2, wherein the trifunctional oligomer comprises about 20% to about 60% by weight of the composition, the monomer or monomer mixture comprises about 30% to about 65% by weight of the composition, the photoinitiator comprises 0.001% to about 10% by weight of the composition, the polyester resin comprises about 1% by weight of the composition, the polycarboxylic acid comprises about 0.01% to about 5% by weight of the composition, and the supplemental adhesion promoter comprises about 0.1% to about 5% by weight of the composition.

7. The method of claim 1, wherein the trifunctional oligomer is a trifunctional aliphatic polyester urethane acrylate oligomer and has a molecular weight of from about 1,200 to about 3,000.

8. The method of claim 7, wherein the monomer or monomer mixture is selected from the group consisting of isobornyl acrylate, isodecyl acrylate, 1,6 hexanediol diacrylate, and mixtures thereof.

9. The method of claim 8, wherein the photoinitiator is selected from the group consisting of phenylbis(2,4,6-trimethylbenzoyl)-phosphine oxide, 1-hydroxy-cyclohexylphenylketone, 2-hydroxy-2-methyl-1-phenyl-1-propanone, phosphine derivatives and mixtures thereof.

10. The method of claim 6, wherein the trifunctional oligomer comprises a trifunctional aliphatic polyester urethane acrylate oligomer and has a molecular weight from about 1,200 to about 3,000, the monomer or monomer mixture is selected from the group consisting of isobornyl acrylate, isodecyl acrylate, 1,6 hexanediol diacrylate and mixtures thereof, the photoinitiator is selected from the group consisting of phenylbis(2,4,6-trimethylbenzoyl)-phosphine oxide, 2-hydroxy-2-methyl-1-phenyl-1-propanone, 1-hydroxy-cyclohexylphenylketone, phosphine derivatives and mixtures thereof, the polycarboxylic acid is unsaturated, and the supplemental adhesion promoter is a phosphoric acid ester or a mixture comprising a phosphoric acid ester and an acrylic or an acrylic acrylate.

11. The method of claim 6, wherein the trifunctional oligomer comprises about 20% to about 55% by weight of the composition, the monomer or monomer mixture comprises about 30% to about 55% by weight of the composition, the photoinitiator comprises 0.001% to about 10% by weight of the composition, the polyester resin comprises about 1% by weight of the composition, the polycarboxylic acid comprises about 0.01% to about 3% by weight of the composition, and the supplemental adhesion promoter is a phosphoric acid ester or a mixture a phosphoric acid and an acrylic or acrylic acrylate, and wherein the monomer or monomer mixture comprises at least about 50% by weight of a monofunctional monomer.

12. The method of claim 11, wherein the trifunctional oligomer comprises a trifunctional aliphatic polyester urethane acrylate oligomer and has a molecular weight from about 1,200 to about 3,000, the monomer or monomer mixture is selected from the group consisting of isobornyl acrylate, isodecyl acrylate, 1,6 hexanediol diacrylate and mixtures thereof, the photoinitiator is selected from the group consisting of phenylbis(2,4,6-trimethylbenzoyl)-phosphine oxide, 2-hydroxy-2-methyl-1-phenyl-1-propanone, 1-hydroxy-cyclohexylphenylketone, phosphine derivatives and mixtures thereof, the polycarboxylic acid is unsaturated, and the supplemental adhesion promoter is a phosphoric acid ester.

13. The method of claim 1, wherein the curable coating composition further comprises a colorant.

14. The curable coating composition of claim 13, wherein the colorant is a pigment, the curable coating composition comprises a monofunctional monomer and a difunctional monomer, and wherein the weight ratio of the monofunctional monomer to the difunctional monomer ranges from about 1:1 to about 5:1.

15. The method of claim 13, wherein the trifunctional oligomer comprises about 15% to about 60% by weight of the composition, the monomer or monomer mixture comprises about 30% to about 65% by weight of the composition, the photoinitiator comprises 0.001% to about 10% by weight of the composition, the polyester resin comprises about 1% by weight of the composition, the supplemental adhesion promoter comprises about 0.1% to about 5% by weight of the composition, and the polycarboxylic acid comprises about 0.01% to about 10% by weight of the composition.

16. The method of claim 15, wherein the trifunctional oligomer comprises a trifunctional aliphatic polyester urethane acrylate oligomer and has a molecular weight from about 1,200 to about 3,000, the monomer or monomer mixture is selected from the group consisting of isobornyl acrylate, isodecyl acrylate, 1,6 hexanediol diacrylate and mixtures thereof, the photoinitiator is selected from the group consisting of phenylbis(2,4,6-trimethylbenzoyl)-phosphine oxide, 2-hydroxy-2-methyl-1-phenyl-1-propanone, 1-hydroxy-cyclohexylphenylketone, phosphine derivatives and mixtures thereof, the polycarboxylic acid is unsaturated, the supplemental adhesion promoter is a phosphoric acid ester, and the colorant is a pigment.

17. The method of claim 16, wherein the trifunctional oligomer comprises about 40% to about 60% by weight of the composition, the monomer or monomer mixture comprises about 35% to about 55% by weight of the composition, the photoinitiator comprises 0.001% to about 10% by weight of the composition, the polyester resin comprises about 1% by weight of the composition, the polycarboxylic acid comprises about 0.01% to about 5% by weight of the composition, the supplemental adhesion promoter comprises about 0.1% to about 3% by weight of the composition, and the pigment comprises about 0.1% to about 10% by weight of the composition, and wherein the monomer or monomer mixture comprises at least about 50% by weight of a monofunctional monomer.

18. The method of claim 1, wherein the curable coating composition further comprises an aesthetic agent.

19. The method of claim 18, wherein the curable coating composition comprises a monofunctional monomer and a difunctional monomer, and wherein the weight ratio of the monofunctional monomer to the difunctional monomer ranges from about 20:1 to about 5:1.

20. The method of claim 18, wherein the trifunctional oligomer comprises about 15% to about 50% by weight of the composition, the monomer or monomer mixture comprises about 30% to about 70% by weight of the composition, the photoinitiator comprises 0.001% to about 10% by weight of the composition, the polyester resin comprises about 1% by weight of the composition, the polycarboxylic acid comprises about 0.01% to about 5% by weight of the composition, the supplemental adhesion promoter comprises about 0.1% to about 3% by weight of the composition, and the aesthetic agent comprises about 0.1% to about 30% by weight of the composition.

21. The method of claim 20, wherein the trifunctional oligomer comprises a trifunctional aliphatic polyester urethane acrylate oligomer and has a molecular weight from about 1,200 to about 3,000, the monomer or monomer mixture is selected from the group consisting of isobornyl acrylate, isodecyl acrylate, 1,6 hexanediol diacrylate and mixtures thereof, the photoinitiator is selected from the group consisting of phenylbis(2,4,6-trimethylbenzoyl)-phosphine oxide, 2-hydroxy-2-methyl-1-phenyl-1-propanone, 1-hydroxy-cyclohexylphenylketone, phosphine derivatives and mixtures thereof, the polycarboxylic acid is unsaturated, the supplemental adhesion promoter is a phosphoric acid ester or a mixture comprising a phosphoric acid ester and an acrylic or acrylic acrylate, and the aesthetic agent is selected from the group consisting of silica sand, quartz grit. silica, talc and mixtures thereof.

22. The method of claim 21, wherein the trifunctional oligomer comprises about 20% to about 30% by weight of the composition, the monomer or monomer mixture comprises about 50% to about 60% by weight of the composition, the photoinitiator comprises 0.001% to about 10% by weight of the composition, the polyester resin comprises about 1% by weight of the composition, the polycarboxylic acid comprises about 0.01% to about 3% by weight of the composition, the supplemental adhesion promoter comprises about 0.1% to about 3% by weight of the composition, and the aesthetic agent comprises about 0.1% to about 20% by weight of the composition.

23. The method of claim 18, wherein the curable coating composition further comprises a colorant.

24. The method of claim 23, wherein the trifunctional oligomer comprises about 15% to about 50% by weight of the composition, the monomer or monomer mixture comprises about 30% to about 60% by weight of the composition, the photoinitiator comprises 0.001% to about 10% by weight of the composition, the polyester resin comprises about 1% by weight of the composition, the polycarboxylic acid comprises about 0.01% to about 5% by weight of the composition, the aesthetic agent comprises about 0.1% to about 30% by weight of the composition, the supplemental adhesion promoter comprises about 0.1% to about 3% by weight of the composition, and the colorant comprises about 0.1% to about 15% by weight of the composition.

25. The method of claim 24, wherein the trifunctional oligomer comprises a trifunctional aliphatic polyester urethane acrylate oligomer and has a molecular weight from about 1,200 to about 3,000, the monomer or monomer mixture is selected from the group consisting of isobomyl acrylate, isodecyl acrylate, 1,6 hexanediol diacrylate and mixtures thereof, the photoinitiator is selected from the group consisting of phenylbis(2,4,6-trimethylbenzoyl)-phosphine oxide, 2-hydroxy-2-methyl-1-phenyl-1-propanone, -hydroxy-cyclohexylphenylketone, phosphine derivatives and mixtures thereof, the polycarboxylic acid is unsaturated, the supplemental adhesion promoter is a phosphoric acid ester or a mixture comprising a phosphoric acid ester and an acrylic or acrylic acrylate, the aesthetic agent is selected from the group consisting of silica sand, quartz grit, silica, talc, and mixtures thereof, and the colorant comprises a pigment.

26. The method of claim 25, wherein the trifunctional oligomer comprises about 20% to about 30% by weight of the composition, the monomer or monomer mixture comprises about 30% to about 45% by weight of the composition, the photoinitiator comprises 0.001% to about 10% by weight of the composition, the polyester resin comprises about 1% by weight of the composition, the polycarboxylic acid comprises about 0.01% to about 3% by weight of the composition, the supplemental adhesion promoter comprises about 0.1% to about 3% by weight of the composition, the aesthetic agent comprises about 0.1% to about 20% by weight of the composition, and the pigment comprises about 0.1% to about 15% of the composition.

27. The method of claim 1, wherein the composite substrate is not primed prior to the application of the curable coating composition onto the substrate.

28. The method of claim 1, wherein the curable coating composition is cured by UV radiation.

29. The method of claim 28, wherein the curable coating composition is cured by at least two different UV wavelengths.

30. The method of claim 1, wherein the composite substrate is a plastic composite substrate.

31. The method of claim 1, wherein the composite substrate is a PVC composite substrate.

32. A method for providing a plastic substrate with a cured coating comprising applying a curable coating composition onto a plastic substrate and curing the coating composition, wherein the curable coating composition comprises a trifunctional oligomer, a monomer or monomer mixture selected from the group consisting of monofunctional monomers, difunctional monomers and mixtures thereof, a photoinitiator, a supplemental adhesion promoter comprising a phosphoric acid ester, a polyester resin and a polycarboxylic acid, wherein the polyester resin comprises about 1% by weight of the composition.

33. The method of claim 32, wherein the trifunctional oligomer comprises about 10% to about 80% by weight of the composition, the monomer or monomer mixture comprises about 25% to about 75% by weight of the composition, the photoinitiator comprises 0.001% to about 10% by weight of the composition, the polyester resin comprises about 1% by weight of the composition, supplemental adhesion promoter comprising about 0.1% to about 5% by weight of the composition, and the polycarboxylic acid comprises about 0.01% to about 10% by weight of the composition.

34. The method of claim 32, wherein the curable coating composition comprises no more than about 1% by weight of an organic solvent.

35. The method of claim 33, wherein the trifunctional oligomer comprises about 15% to about 60% by weight of the composition, the monomer or monomer mixture comprises about 30% to about 65% by weight of the composition, the photoinitiator comprises 0.001% to about 10% by weight of the composition, the polyester resin comprises about 1% by weight of the composition, the polycarboxylic acid comprises about 0.01% to about 5% by weight of the composition, and the supplemental adhesion promoter comprises about 0.1% to about 5% by weight of the composition.

36. The method of claim 35, wherein the trifunctional oligomer comprises a trifunctional aliphatic polyester urethane acrylate oligomer and has a molecular weight from about 1,200 to about 3,000, the monomer or monomer mixture is selected from the group consisting of isobomyl acrylate, isodecyl acrylate, 1,6 hexanediol diacrylate and mixtures thereof, the photoinitiator is selected from the group consisting of phenylbis(2,4,6-trimethylbenzoyl)-phosphine oxide, 2-hydroxy-2-methyl-1-phenyl-1-propanone, 1-hydroxy-cyclohexylphenylketone, phosphine derivatives and mixtures thereof, the polycarboxylic acid is unsaturated, and the supplemental adhesion promoter is a phosphoric acid ester or a mixture comprising a phosphoric acid ester and an acrylic or acrylic acrylate.

37. The method of claim 33, wherein the curable coating composition further comprises a colorant.

38. The method of claim 37, wherein the trifunctional oligomer comprises a trifunctional aliphatic polyester urethane acrylate oligomer and has a molecular weight from about 1,200 to about 3,000, the monomer or monomer mixture is selected from the group consisting of isobomyl acrylate, isodecyl acrylate, 1,6 hexanediol diacrylate and mixtures thereof, the photoinitiator is selected from the group consisting of phenylbis(2,4,6-trimethylbenzoyl)-phosphine oxide, 2-hydroxy-2-methyl-1-phenyl-1-propanone, 1-hydroxy-cyclohexylphenylketone, phosphine derivatives and mixtures thereof, the polycarboxylic acid is unsaturated, the supplemental adhesion promoter is a phosphoric acid ester, and the colorant is a pigment.

39. The method of claim 33, wherein the curable coating composition further comprises an aesthetic agent.

40. The method of claim 33, wherein the plastic substrate is not primed prior to the application of the curable coating composition onto the substrate.

41. The method of claim 33, wherein the curable coating composition is cured by UV radiation.

42. The method of claim 41, wherein the curable coating composition is cured by pulsed UV radiation.

43. A method for providing a plastic substrate with a cured coating comprising applying a curable coating composition onto a plastic substrate and curing the coating composition, said curable coating composition comprising a trifunctional oligomer, a monomer or monomer mixture selected from the group consisting of monofunctional monomers and difunctional monomers, a photoinitiator, a polyester resin, a supplemental adhesion promoter comprising a phosphoric acid ester, a polycarboxylic acid, a pigment, and an aesthetic agent, wherein the monomer or monomer mixture comprises about 30% to about 45% by weight of the composition, the polycarboxylic acid comprises about 0.01% to about 3% by weight of the composition, the polyester resin comprises about 1% by weight of the composition, the supplemental adhesion promoter comprises about 0.1% to about 5% by weight of the composition, the pigment comprises about 0.1% to about 10% by weight of the composition, and the aesthetic agent comprises about 1% to about 10% by weight of the composition.

* * * * *

UNITED STATES PATENT AND TRADEMARK OFFICE
CERTIFICATE OF CORRECTION

PATENT NO. : 8,304,032 B2
APPLICATION NO. : 13/150427
DATED : November 6, 2012
INVENTOR(S) : Smelyansky et al.

It is certified that error appears in the above-identified patent and that said Letters Patent is hereby corrected as shown below:

In column 15, line 15: replace "isobomyl" with --isobornyl--

In column 16, line 31: replace "isobomyl" with --isobornyl--

In column 16, line 48: replace "isobomyl" with --isobornyl--

Signed and Sealed this
Fifteenth Day of January, 2013

David J. Kappos
*Director of the United States Patent and Trademark Office*